United States Patent
Jackson

(10) Patent No.: US 7,721,324 B1
(45) Date of Patent: May 18, 2010

(54) SECURING MANAGEMENT OPERATIONS IN A COMMUNICATION FABRIC

(75) Inventor: Christopher J. Jackson, Westford, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1324 days.

(21) Appl. No.: 10/803,497

(22) Filed: Mar. 18, 2004

(51) Int. Cl.
*G06F 7/04* (2006.01)
*G06F 15/16* (2006.01)
*G06F 17/30* (2006.01)
*H04L 29/06* (2006.01)

(52) U.S. Cl. .............. 726/4; 726/17; 726/21; 726/27; 713/151; 713/160; 713/170; 709/225; 709/232

(58) Field of Classification Search ............ 726/4
See application file for complete search history.

(56) References Cited

U.S. PATENT DOCUMENTS 6,920,106 B1 * 7/2005 Chou et al. ............... 370/229
7,113,995 B1 * 9/2006 Beukema et al. ............. 709/229
2002/0133622 A1 * 9/2002 Pinto ............................ 709/242
2004/0160903 A1 * 8/2004 Gai et al. ..................... 370/254

OTHER PUBLICATIONS

Sailer et al. "History Based Distributed Filtering—A Tagging Approach to Network-Level Access Control" IEEE 2000, pp. 373-382.*

* cited by examiner

*Primary Examiner*—Emmanuel L Moise
*Assistant Examiner*—Shewaye Gelagay
(74) *Attorney, Agent, or Firm*—Park, Vaughan & Fleming LLP

(57) ABSTRACT

A system and method for preventing untrusted nodes from sending or receiving management communications. In an environment such as an InfiniBand communication fabric, a management packet (e.g., a packet traversing virtual lane 15) is one of four types: 1) Request from a manager node (e.g., Subnet Manager or SM) to an endnode; 2) Reply from an endnode to a request from the manager; 3) Request from an endnode to the manager; and 4) Reply from the manager to the endnode. Switches (and other routing devices) are configured to allow untrusted nodes to send management packets of types 2 and 3 only, and to receive management packets of types 1 and 4 only. Trusted nodes (e.g., manager nodes, switches) can send and receive all types. Each port of a switch or routing device has an associated indicator reflecting the level of trust afforded the node or switch coupled to the port.

28 Claims, 2 Drawing Sheets

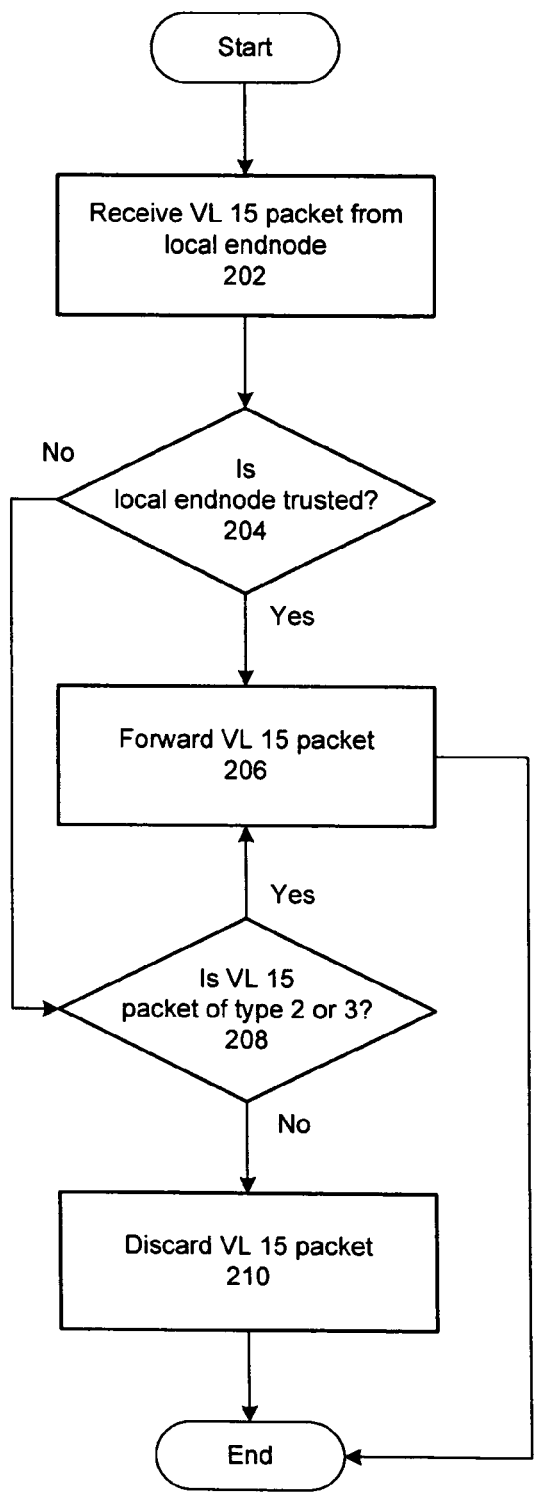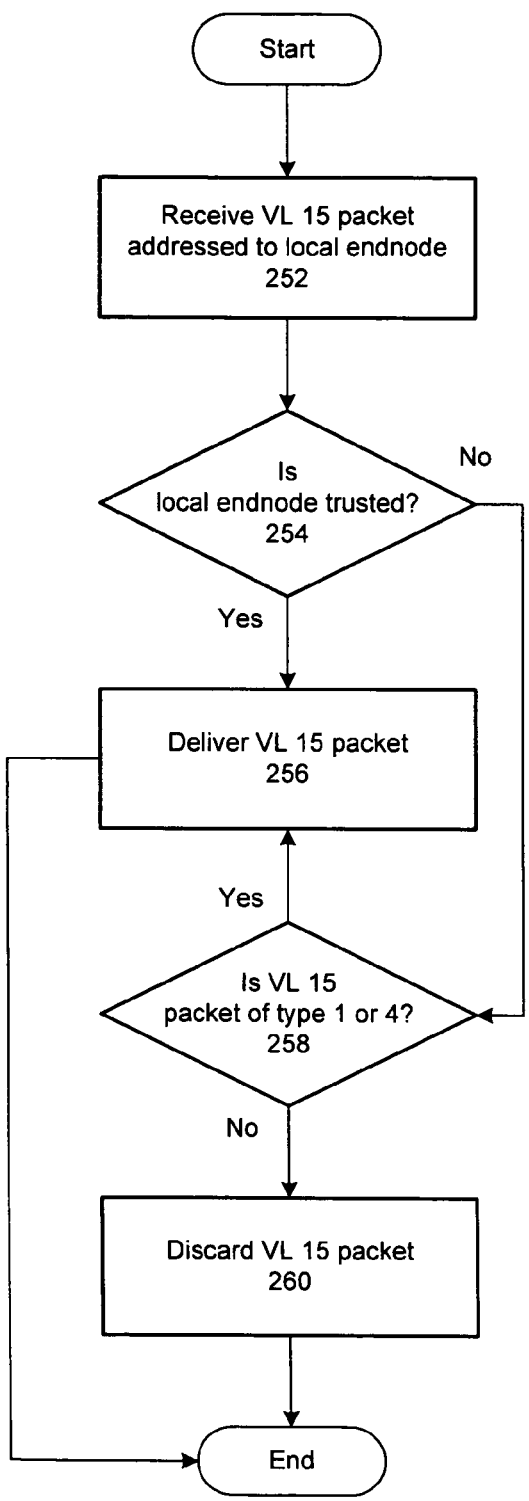
FIG. 2A  FIG. 2B

SECURING MANAGEMENT OPERATIONS IN A COMMUNICATION FABRIC

BACKGROUND

This invention relates to the field of computer systems. More particularly, a system and methods are provided for preventing nodes in a communication fabric from sending or receiving unauthorized communications, particularly management operations.

Endnodes of an InfiniBand fabric include host computer systems and target devices (e.g., storage devices). Endnodes are coupled together via various communication links and devices for switching or routing communications through the fabric. A fabric may include any number of subnets, with each subnet comprising any number of endnodes, communication links and switching elements. All nodes in one subnet are managed by a Subnet Manager (SM) and share a common network address space.

Endnodes may be segregated into logical partitions within a subnet or fabric. Each endnode is a member of one or more partitions and, except for subnet management operations, is permitted to communicate only with other nodes in its partition(s). Each communication (possibly excepting management communications) includes a field identifying the partition to which it belongs (i.e., the partition in which it was generated). Switching devices are configured to prevent normal communications from an endnode in one partition from being delivered to a node that is not a member of the same partition.

One reason nodes may be segregated into partitions is to group promiscuous or "dumb" nodes accordingly. These are nodes that will allow virtually any other nodes to use their resources, or that may attempt to use any resources in the same partition. Another reason to use partitions is to segregate and help ensure the confidentiality of information, so that nodes in one partition cannot access data residing in another partition. In this case, a node in one partition should not be able to communicate with a node in a different partition, even if one or both of them wish to communicate.

Within an InfiniBand subnet, the Subnet Manager maintains each endnode's partition key table, which identifies the partitions in which the endnode is a member. In InfiniBand, each partition in which an endnode is a member is identified in the table by a partition key (P_Key).

According to the InfiniBand specification, a P_Key is 16 bits long: 15 bits for a partition number and 1 bit for a membership field. The membership field is set to a first value if the endnode is a full member, and a second value if the endnode is a limited member. Full members of a partition can send messages to any member of the partition, while limited members can only send messages to full members.

Each endnode's partition key table is configured by the endnode's subnet manager, through the exchange of Subnet Management Packets (SMP). The InfiniBand specification requires that endnodes be prevented from writing to their partition key tables.

Endnodes communicate via end-to-end communication connections termed queue pairs (QP). Each queue pair allows two endnodes to communicate, and is associated with a partition to which they both belong. Thus, when one endnode sends a message to another node, that message will include the P_Key of a partition to which they both belong.

When an endnode receives a normal InfiniBand packet, it compares the P_Key in the header of the packet to the P_Key of the partition for the queue pair over which the communication was received. It also ensures the membership bits are compatible. If the P_Key does not match, or the memberships are incompatible, the packet may be discarded. An endnode may report receipt of a bad or incompatible P_Key to a subnet manager.

However, InfiniBand provides that P_Keys of SMPs, which travel on a restricted virtual lane (VL 15), are ignored. Thus, SMPs may be sent or received by any endnode. This creates a security problem. In particular, administrative policy normally prevents endnodes in different partitions from communicating from each other. However, misbehaving endnodes may be able to circumvent this prohibition by enclosing their communications within SMPs.

Another security shortfall allows an endnode to impersonate a Subnet Manager. For example, when an endnode boots in a partition, an impersonator may portray itself as the SM for that partition before the endnode establishes communication with the true SM. This allows the impersonator to use the resources of the endnode, make the endnode act as a proxy for the impersonator, and so on.

Thus, there is a need for a system and a method for promoting more secure management of a communication fabric. In particular, it is necessary to prevent unauthorized nodes from impersonating a manager node, and for preventing nodes from circumventing communication restrictions (e.g., by using a special or restricted channel).

SUMMARY

In one embodiment of the invention, a system and methods are provided for sending or receiving management communications. In an environment such as an InfiniBand communication fabric, a packet traversing virtual lane 15, such as a management packet (e.g., Subnet Management Packet or SMP), is one of four types: 1) Request from a manager node (e.g., Subnet Manager or SM) to an endnode; 2) Reply from an endnode to a request from the manager; 3) Request from an endnode to the manager; and 4) Reply from the manager to the endnode.

Switches (and other routing devices) are configured to allow untrusted nodes to send management packets of types 2 and 3 only, and to receive management packets of types 1 and 4 only. Trusted nodes (e.g., manager nodes, switches) can send and receive all types. Each port of a switch or routing device has an associated indicator reflecting the level of trust afforded the node or switching device coupled to the port.

DESCRIPTION OF THE FIGURES

FIG. 2A is a flowchart illustrating one method of preventing an untrusted node from sending an unauthorized management communication, in accordance with one embodiment of the invention.

FIG. 2B is a flowchart illustrating one method of preventing an untrusted node from receiving an unauthorized management communication, in accordance with one embodiment of the invention.

DETAILED DESCRIPTION

Figure 1:
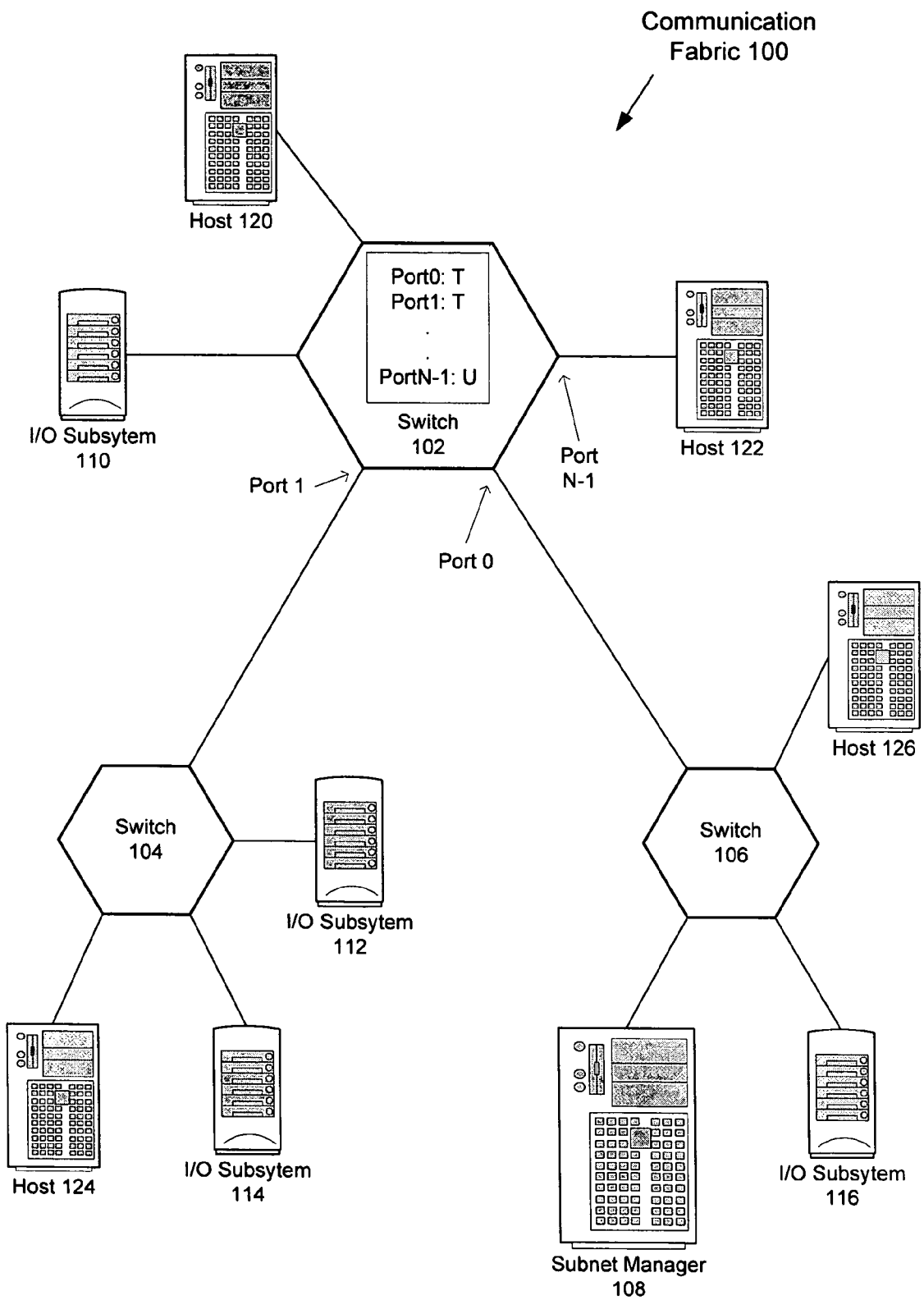
FIG. 1 is a block diagram depicting a communication fabric in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for enhancing the security of a communication fabric by preventing nodes in the fabric from initiating or receiving prohibited communications, such as management operations. This security feature can help prevent nodes in different partitions of the fabric from communicating with each other, and can help prevent impersonation of a management node (e.g., a Subnet Manager).

Embodiments of the invention are described herein as they may be implemented in an InfiniBand network. However, the scope of the invention is not limited to InfiniBand, and embodiments of the invention suitable for implementation in other environments may be derived from the following descriptions.

In an embodiment of the invention, each port of a switching element in a communication fabric is assigned an indicator reflecting a level of trust given to the link partner node of the communication link connected to that port. The level of trust determines whether a particular type of SMP (Subnet Management Packet) may or may not be sent or received through the port.

In one implementation, a two-state indicator is sufficient. A first state (e.g., 1) indicates the link partner node is trusted; a second state (e.g., 0) indicates the partner is not trusted. A port indicator may be set via a secure channel other than the default InfiniBand management channel (VL 15), such as through an onboard Ethernet connection.

In this implementation, a trusted node is permitted to send or receive any type of SMP. An untrusted node is only able to receive SMPs sent from an SM and is only able to send SMPs to an SM. Illustratively, only a trusted node can be a Subnet Manager (SM), and switches and other switching devices are configured to trust each other.

Other policies may be applied in other embodiments of the invention. For example, only switches that are upstream of a given switch may be trusted by that switch (i.e., switches that are closer (or on a path) to a subnet manager).

FIG. 1 is a block diagram of a communication fabric in which an embodiment of the invention may be implemented. In this embodiment, communication fabric 100 includes subnet manager 108 for managing any number of partitions in the fabric.

Fabric 100 also includes switches 102, 104 and 106, I/O subsystems 110, 112, 114 and 116, plus hosts 120, 122, 124 and 126. Each host is coupled to the fabric via a Host Channel Adapter (HCA), while each I/O subsystem is coupled to the fabric via a Target Channel Adapter (TCA). In other embodiments of the invention, a fabric may comprise any number and types of endnodes and switching devices.

Each endnode in fabric 100 has a partition key table for storing P_Keys for the partitions to which the endnode belongs. A partition key table may be configured to store any number of P_Keys (e.g., 8, 16, 256).

Switch 102 is expanded to show an illustrative set of trust indicators. A separate trust indicator is associated with each port of switch 102. Each port that is coupled to a switch is marked as trusted, while the setting of each port coupled to an endnode depends upon a level of trust in the endnode. Thus, for an endnode (e.g., host 122) that is not physically secure (e.g., available for uncontrolled access), a switch port to which the endnode is coupled may be marked as untrusted.

A trust indicator may comprise a register or other portion of memory (e.g., a single bit), or may comprise hardware such as a DIP (Dual Inline Package) switch.

In one implementation of this embodiment, a switch port coupled to a host is only set to trusted if the host is trusted enough to act as a subnet manager or backup subnet manager. For example, only endnodes that are under the control of a fabric administrator or subnet administrator may be trusted. Therefore, the port of switch 106 to which subnet manager 108 is coupled would be necessarily be marked as trusted. In this implementation, switch ports coupled to other hosts and other endnodes (e.g., I/O subsystems) would be marked untrusted.

In one embodiment of the invention for an InfiniBand environment, all packets traveling on virtual lane 15 may be separated into four categories or types:

Category 1: A subnet management request from the SM to an endnode;

Category 2: A reply from an endnode to a subnet management request from the SM;

Category 3: A subnet management request from an endnode to the SM; and

Category 4: A subnet management reply from the SM to a request from an endnode.

Categorization of a particular SMP may be made based on the management class or method in which the SMP was generated. Category 3 SMPs may be considered to include trap-reports from endnodes regarding errors or exceptional situations.

In an InfiniBand fabric, other packets traversing virtual lane 15 (VL 15), such as malformed or syntactically incorrect SMPs, must also be categorized. They may be placed in any of the four categories defined above, as long as the categorization of a particular packet is consistent throughout the fabric.

In this embodiment of the invention, untrusted endnodes (i.e., endnodes coupled to switching ports that have indicators set to something other than "trusted") are only permitted to send VL 15 packets in categories 2 and 3, and are only permitted to receive VL 15 packets in categories 1 and 4. Trusted endnodes (i.e., endnodes coupled to switching ports that have indicators set to "trusted"), and switches, can send and receive all four categories of VL 15 packets.

Each VL 15 packet is examined at the switch that would normally forward the packet to an endnode or receive it from the endnode, based on the port switch through which the packet is received or is to be sent. This switch will discard VL 15 packets received from or directed to an endnode (and/or may report them to the Subnet Manager) if they are not of a permitted type. Thus, no VL 15 packet will be able to traverse a communication fabric if it is not initiated by or directed to a trusted node.

This scheme prevents an untrusted endnode from using virtual lane 15 of an InfiniBand fabric to evade partitioning restrictions, because all packets it sends on that virtual lane will only be forwarded if they are classified as category 2 or category 3 packets, and these types of packets will not be delivered to any untrusted endnode.

Also, because only trusted nodes can send category 1 and category 4 VL 15 packets, only trusted endnodes can operate as Subnet Managers; thus, an untrusted node cannot impersonate a Subnet Manager.

FIGS. 2A and 2B demonstrate methods of preventing a node in a communication fabric from sending or receiving an unauthorized communication, according to one embodiment of the invention. FIG. 2A demonstrates how a switch, router, channel adapter or other device for routing a communication may prevent a local endnode from sending an unauthorized virtual lane 15 (VL 15) packet. FIG. 2B demonstrates how a device for routing a communication may prevent a local endnode from receiving an unauthorized VL 15 packet.

Referring to FIG. 2A, in operation 202 a switch or other communication routing device receives a VL 15 packet from a local endnode. Illustratively, the endnode is coupled to one of the switch's ports. The type or category of the VL 15 packet can be identified by examining a header of the packet.

In operation 204, the switch determines whether the local endnode is trusted. Illustratively, an indicator associated with the port to which the endnode is coupled will be configured to indicate whether the endnode is trusted or not. In this embodiment of the invention, trusted endnodes are permitted to send (and receive) any type or category of VL 15 packet.

If the endnode is trusted, the method continues with operation 206; otherwise, the method advances to operation 208.

In operation 206, the switch forwards the VL 15 packet, after which the illustrated method ends.

In operation 208, the endnode is not trusted, and so the switch must examine the type of VL 15 packet the endnode is attempting to send. In this embodiment of the invention, untrusted nodes are only permitted to send category 2 and category 3 VL 15 packets. A category 2 VL 15 packet generally comprises a reply to a request from a Subnet Manager (SM); a category 3 VL 15 packet generally comprises a request addressed to an SM.

If the endnode is attempting to send a type 2 or type 3 VL 15 packet, the method continues with operation 206; otherwise, the method advances to operation 210.

In operation 210, the VL 15 packet is discarded because it is of a type that the endnode is not permitted to send. The switch may report the attempt to send an unauthorized VL 15 packet, to an SM or other entity. After operation 210, the method of FIG. 2A ends.

Referring now to FIG. 2B, in operation 252 a switch or other communication routing device receives a VL 15 packet directed to a local endnode. coupled to one of the switch's ports. The type or category of the VL 15 packet can be identified by examining a header of the packet.

In operation 254, the switch determines whether the local endnode is trusted. Illustratively, an indicator associated with the port to which the endnode is coupled will be configured to indicate whether the endnode is trusted or not. In this embodiment of the invention, trusted endnodes are permitted to receive (and send) any type or category of VL 15 packet.

If the endnode is trusted, the method continues with operation 256; otherwise, the method advances to operation 258.

In operation 256, the switch forwards the VL 15 packet to the local endnode, after which the illustrated method ends.

In operation 258, the endnode is not trusted, and so the switch must examine the type of VL 15 packet it has received for the endnode. In this embodiment of the invention, untrusted nodes are only permitted to receive category 1 and category 4 VL 15 packets. A category 1 VL 15 packet generally comprises a request from a Subnet Manager (SM); a category 4 VL 15 packet generally comprises a response from an SM to a request from the endnode.

If the VL 15 packet is of type 1 or type 4, the method continues with operation 256; otherwise, the method advances to operation 260.

In operation 260, the VL 15 packet is discarded because it is of a type that the endnode is not permitted to receive. The switch may report the unauthorized VL 15 packet, to an SM or other entity. After operation 260, the method of FIG. 2B ends.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of preventing an endnode in a communication fabric from receiving an unauthorized communication, comprising:
    establishing a first category of management communications to include:
        a request from a manager node to an endnode; and
        a reply from the manager node to a request from an endnode;
    establishing a second category of management communications to include:
        a reply from an endnode to a request from the manager node; and
        a request from an endnode to the manager node; and
    at a switching device coupled to a first endnode:
        receiving from the communication fabric a management communication packet addressed to the first endnode;
        determining whether the first endnode is a trusted endnode;
        determining whether the management communication is a first category management communication; and
        responsive to the first endnode not being a trusted endnode and the management communication not being a first category management communication, discarding the management communication.

2. The method of claim 1, further comprising:
    classifying each endnode in the communication fabric as either trusted or untrusted.

3. The method of claim 2, wherein said classifying comprises:
    associating with each port of the switching device an indicator configured to indicate whether a node coupled to the port is trusted.

4. The method of claim 2, wherein said classifying comprises:
    classifying the first endnode as a trusted endnode if the first endnode is a manager node.

5. The method of claim 2, wherein said classifying comprises:
    classifying the first endnode as an untrusted endnode if the first endnode is not configured to act as a manager node.

6. The method of claim 1, wherein said determining comprises:

reading an indicator associated with a port of the switch to which the first endnode is coupled;

wherein said indicator is configured to indicate whether the first endnode is trusted.

7. The method of claim 1, further comprising, at the switching device:

responsive to the first endnode being a trusted endnode, forwarding the management communication to the first endnode regardless of the category of the management communication.

8. The method of claim 1, further comprising, at the switching device:

receiving a second management communication from the first endnode; and responsive to the management communication not being a second category management communication, discarding the second management communication.

9. The method of claim 1, wherein the communication fabric comprises a subnet of an InfiniBand communication fabric.

10. The method of claim 9, wherein a management communication comprises a communication transmitted on virtual lane 15 of the InfiniBand communication fabric.

11. A computer readable storage medium for storing instructions that, when executed by a computer, cause the computer to perform a method of preventing an endnode in a communication fabric from receiving an unauthorized communication, comprising:

establishing a first category of management communications to include:

a request from a manager node to an endnode; and a reply from the manager node to a request from an endnode;

establishing a second category of management communications to include:

a reply from an endnode to a request from the manager node; and a request from an endnode to the manager node; and at a switching device coupled to a first endnode:

receiving from the communication fabric a management communication addressed to the first endnode;

determining whether the first endnode is a trusted endnode;

determining whether the management communication is a first category management communication; and responsive to the first endnode not being a trusted endnode and the management communication not being a first category management communication, discarding the management communication.

12. An automated method of preventing an endnode in a communication fabric from sending an unauthorized communication, comprising:

establishing a first category of management communications to include:

a request from a manager node to an endnode; and a reply from the manager node to a request from an endnode;

establishing a second category of management communications to include:

a reply from an endnode to a request from the manager node; and a request from an endnode to the manager node; and at a switching device coupled to a first endnode:

receiving from a first endnode a management communication addressed to a second endnode in the communication fabric;

determining whether the first endnode is a trusted endnode;

determining whether the management communication is a second category management communication; and responsive to the first endnode not being a trusted endnode and the management communication not being a second category management communication, discarding the management communication.

13. The method of claim 12, further comprising:

classifying each endnode in the communication fabric as either trusted or untrusted.

14. The method of claim 12, wherein said classifying comprises:

associating with each port of the switching device an indicator configured to indicate whether a node coupled to the port is trusted.

15. The method of claim 12, wherein said classifying comprises:

responsive to the first endnode being a manager node, classifying the first endnode as a trusted endnode.

16. The method of claim 12, wherein said classifying comprises:

responsive to the first endnode not being configured to act as a manager node, classifying the first endnode as an untrusted endnode.

17. The method of claim 12, wherein said determining comprises:

reading an indicator associated with a port of the switch to which the first endnode is coupled;

wherein said indicator is configured to indicate whether the first endnode is trusted.

18. The method of claim 12, further comprising, at the switching device:

responsive to the first endnode being a trusted endnode, forwarding the management communication toward the second endnode regardless of the category of the management communication.

19. The method of claim 12, further comprising, at the switching device:

receiving a second management communication addressed to the first endnode; and responsive to the management communication not being a first category management communication, discarding the second management communication.

20. The method of claim 12, wherein the communication fabric comprises a subnet of an InfiniBand communication fabric.

21. The method of claim 20, wherein a management communication comprises a communication transmitted on virtual lane 15 of the InfiniBand communication fabric.

22. A computer readable storage medium for storing instructions that, when executed by a computer, cause the computer to perform a method of preventing an endnode in a communication fabric from sending an unauthorized communication, comprising:

establishing a first category of management communications to include:

a request from a manager node to an endnode; and a reply from the manager node to a request from an endnode;

establishing a second category of management communications to include:

a reply from an endnode to a request from the manager node; and a request from an endnode to the manager node; and at a switching device coupled to a first endnode:

receiving from a first endnode a management communication addressed to a second endnode in the communication fabric;

determining whether the first endnode is a trusted endnode;

determining whether the management communication is a second category management communication based; and responsive to the first endnode not being a trusted endnode, discarding the management communication if the management communication is not a second category management communication.

23. An apparatus for preventing a node in a communication fabric from engaging in unauthorized communication, the apparatus comprising:

a switching device configured to route management communications through the communication fabric, wherein:

a type one management communication comprises requests from a manager node to endnodes and replies from the manager node to requests from endnodes; and a type two management communication comprises replies from endnodes to requests from the manager node and requests from endnodes to the manager node;

for each port of the switching device, an indicator configured to indicate whether an endnode coupled to the port is trusted;

wherein a first management communication addressed to a first endnode coupled to a first port of the switching device is discarded responsive to the first endnode not being a trusted endnode and the first management communication not being a type one management communication; and wherein a second management communication received from the first endnode is discarded responsive to the first endnode not being a trusted endnode and the second management communication not being a type two management communication.

24. The apparatus of claim 23, further comprising:
a secure channel configured to allow a management node to configure said indicators.

25. The apparatus of claim 23, wherein:
for each port coupled to another switching element, said indicator is set to indicate the other switching element is trusted.

26. The apparatus of claim 23, wherein:
for each port coupled to a management node, said indicator is set to indicate the management node is trusted.

27. The apparatus of claim 23, wherein:
for each port coupled to an endnode that is not configured to act as a management node, said indicator is set to indicate the endnode is not trusted.

28. The apparatus of claim 23, wherein:
the communication fabric comprises an InfiniBand communication fabric; and
a management communication comprises a communication transmitted over virtual lane 15 of the InfiniBand communication fabric.

* * * * *